United States Patent
Radpour

(10) Patent No.: US 7,916,655 B2
(45) Date of Patent: Mar. 29, 2011

(54) TRAFFIC MODELING FOR PACKET DATA COMMUNICATIONS SYSTEM DIMENSIONING

(75) Inventor: Assad Radpour, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 836 days.

(21) Appl. No.: 11/834,166

(22) Filed: Aug. 6, 2007

(65) Prior Publication Data

US 2008/0019325 A1 Jan. 24, 2008

Related U.S. Application Data

(63) Continuation of application No. 10/253,633, filed on Sep. 25, 2002, now Pat. No. 7,307,961.

(51) Int. Cl.
*H04J 3/16* (2006.01)

(52) U.S. Cl. ......... 370/252; 370/254; 455/450; 455/451

(58) Field of Classification Search ............... 370/252, 370/254, 318; 455/450, 451
See application file for complete search history.

(56) References Cited

U.S. PATENT DOCUMENTS

| | | | |
|---|---|---|---|
| 5,270,919 A | 12/1993 | Blake et al. | |
| 5,764,740 A | 6/1998 | Holender | |
| 5,764,957 A | 6/1998 | Kihl et al. | |
| 5,872,918 A | 2/1999 | Malomsoky et al. | |
| 5,884,174 A | 3/1999 | Nagarajan et al. | |
| 5,886,984 A | 3/1999 | Abu-Amara et al. | |
| 5,930,242 A * | 7/1999 | Mimura ....................... | 370/331 |
| 5,940,373 A | 8/1999 | Chiu et al. | |
| 5,963,867 A | 10/1999 | Reynolds et al. | |
| 6,058,260 A | 5/2000 | Brockel et al. | |
| 6,111,857 A | 8/2000 | Soliman et al. | |
| 6,137,787 A | 10/2000 | Chawla et al. | |
| 6,246,880 B1 | 6/2001 | Iizuka | |
| 6,266,322 B1 | 7/2001 | Berger et al. | |
| 6,353,618 B1 | 3/2002 | Hung et al. | |
| 6,393,030 B1 | 5/2002 | Kim et al. | |
| 6,493,317 B1 | 12/2002 | Ma | |
| 6,501,737 B1 | 12/2002 | Mathal et al. | |
| 6,535,742 B1 | 3/2003 | Jiang et al. | |
| 6,539,228 B1 | 3/2003 | Tateson | |
| 6,567,420 B1 * | 5/2003 | Tiedemann et al. .......... | 370/468 |
| 6,665,273 B1 | 12/2003 | Goguen et al. | |
| 7,024,186 B1 * | 4/2006 | Ishikawa et al. .............. | 455/423 |
| 7,027,448 B2 | 4/2006 | Feldmann et al. | |
| 7,245,346 B2 * | 7/2007 | Weiner et al. ................. | 349/187 |
| 7,277,393 B1 * | 10/2007 | Jacobson et al. .............. | 370/238 |

(Continued)

OTHER PUBLICATIONS

Zeng, "Teletraffic Analysis and Channel Allocation for Personal communication system", May 2001, university of Texas at Dallas, Dissertation.

(Continued)

*Primary Examiner* — Dang T Ton
*Assistant Examiner* — Brian O'Connor
(74) *Attorney, Agent, or Firm* — Greenblum & Bernstein, P.L.C.

(57) ABSTRACT

A packet-based communications network is dimensioned based on a maximum number of users able to receive a predetermined target throughput of data over a predetermined number of channels. For each of an incremental number of users, at least one blocking probability is calculated, based on a traffic distribution model, and a service delay is calculated, based on the blocking probability. An iterative throughput, corresponding to each of the incremental number of users, is determined based on the corresponding blocking probability and service delay. Each iterative throughput is compared to the target throughput. The maximum number of users is identified as the number of users having a corresponding iterative throughput that is closest to and less than target throughput.

20 Claims, 4 Drawing Sheets

U.S. PATENT DOCUMENTS 7,317,684 B2 *   1/2008   Fodor et al. .................. 370/231
2002/0054578 A1   5/2002   Zhang et al.
2003/0046426 A1   3/2003   Nguyen

OTHER PUBLICATIONS

Dhamayanthi et al., "Teletraffic Performance Evaluation of Microcellular Personal Communication Networks (PCN'S) with Prioritized Handoff Procedures", Jan. 1999, IEEE Transactions on Vehicular Technology, p. 137-152.

Awduche et al. "Requirements for Traffic Engineering Over MPLS", Sep. 1999, RFC 2702, Internet Task Force.

Mina, "Introduction to Teletraffic Engineering", 1974, Telephony Publishing.

* cited by examiner

TRAFFIC MODELING FOR PACKET DATA COMMUNICATIONS SYSTEM DIMENSIONING

CROSS-REFERENCE TO RELATED APPLICATIONS

This application is a continuation application of U.S. patent application Ser. No. 10/253,633, filed on Sep. 25, 2002, which is hereby incorporated by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to the field of telecommunications. More particularly, the present invention relates to dimensioning wireless packet-based telecommunications systems, by determining the number of users or the number of base station channels relating to a target traffic throughput.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description, the acronyms are defined as follows:

Code Division Multiple Access (CDMA)
Coding Scheme (CS)
Digital Control Channel (DCH)
Digital Subscriber Line (DSL)
Enhanced Data for Global Evolution (EDGE)
General Packet Radio Service (GPRS)
Global System for Mobile Communications (GSM)
Grade of Service (GoS)
International Telecommunications Union (ITU)
Packet Data Channel (PDCH)
Personal Digital Assistant (PDA)
Public Switched Telephone Network (PSTN)
Quality of Service (QoS)
Time Division Multiple Access (TDMA)
Traffic Channel (TCH)
Transmission Control Protocol/Internet Protocol (TCP/IP)
User Datagram Protocol/Internet Protocol (UDP/IP)
Wideband Code Division Multiple Access (WCDMA)

3. Background Information

The communications industry has experienced significant growth in the demand for wireless communications. The increased demand is related, in part, to the improved quality and reliability of wireless networks, including mobile cellular networks, which have essentially evolved through three generations. The first generation included analog systems that modulated voice signals onto radio frequency (RF) carrier waves, which were transmitted and received between base stations and mobile units. The second generation of cellular networks introduced digital encoding of analog voice signals, and included the time division multiple access (TDMA) and code division multiple access (CDMA) cellular systems. The second generation required a symmetric, full-duplex network and was directed to accommodation of voice traffic. The third generation of cellular systems includes packet-switched transmissions and can accommodate voice, data, audio and video communications.

Third generation cellular networks can be integrated with other packet-based data networks, such as Internet Protocol (IP) based networks. Unlike the previous generation cellular systems, the connections are not dependent on circuit availability. The packet-switched capability enables virtual connections to any end point in the network. Also, new services may be provided, including always-on Internet access and multi-media applications.

Various protocols support packet-based communications in wireless networks, including General Packet Radio Service (GPRS), Enhanced Data for Global Evolution (EDGE) and Wideband Code Division Multiple Access (WCDMA). GPRS and EDGE are derived Global System for Mobile Communications (GSM) technologies, for sending and receiving data packets over a digital cellular network. GPRS, in particular, is well suited for sending and receiving small bursts of data. EDGE increases the data rate to about three times that of GPRS. WCDMA is designed to achieve multiple access by spreading the signal with different codes over a wideband (e.g., 5 MHz), and has been adopted as a standard by the International Telecommunications Union (ITU).

Like any telecommunications network, a packet-switched wireless network must be properly dimensioned. The network must be large enough to accommodate the users at an acceptable quality of service (QoS) for the large variety of supportable applications. However, the network must not be over provisioned, such that the network provider is not able to recover the capital investment in network resources, including base stations, antennae, back haul facilities and the like. Although dimensioning techniques are well established in circuit switched networks, such as the conventional public switched telephone network (PSTN), such dimensioning techniques are not generally and directly applicable to the packet-based networks.

For example, well established Erlang dimensioning models have been used extensively in conventional voice applications to predict the number of trunks needed to satisfy the load from users within a desired performance criteria, including an acceptable blocking probability indicated by the grade of service (GoS). Erlang dimensioning models, as well as other conventional network dimensioning techniques, include embedded assumptions based on well known statistical models of traffic arrival rates, such as the well known Poisson and Markov processes. Such traffic models generally capture the statistical characteristics of actual traffic reasonably well.

No comparable dimensioning tools are available to packet-based network planners, including third generation wireless cellular network planners. The current wireless packet-based network dimensioning tools are largely based on simulations of traffic through base station channels, and other system parameters, and are generally time consuming and have limited applications.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the FIG. 1 is a block diagram showing an exemplary packet-based wireless telecommunications network, according to an aspect of the present invention.

BRIEF DESCRIPTION OF APPENDIX

Figure 1:
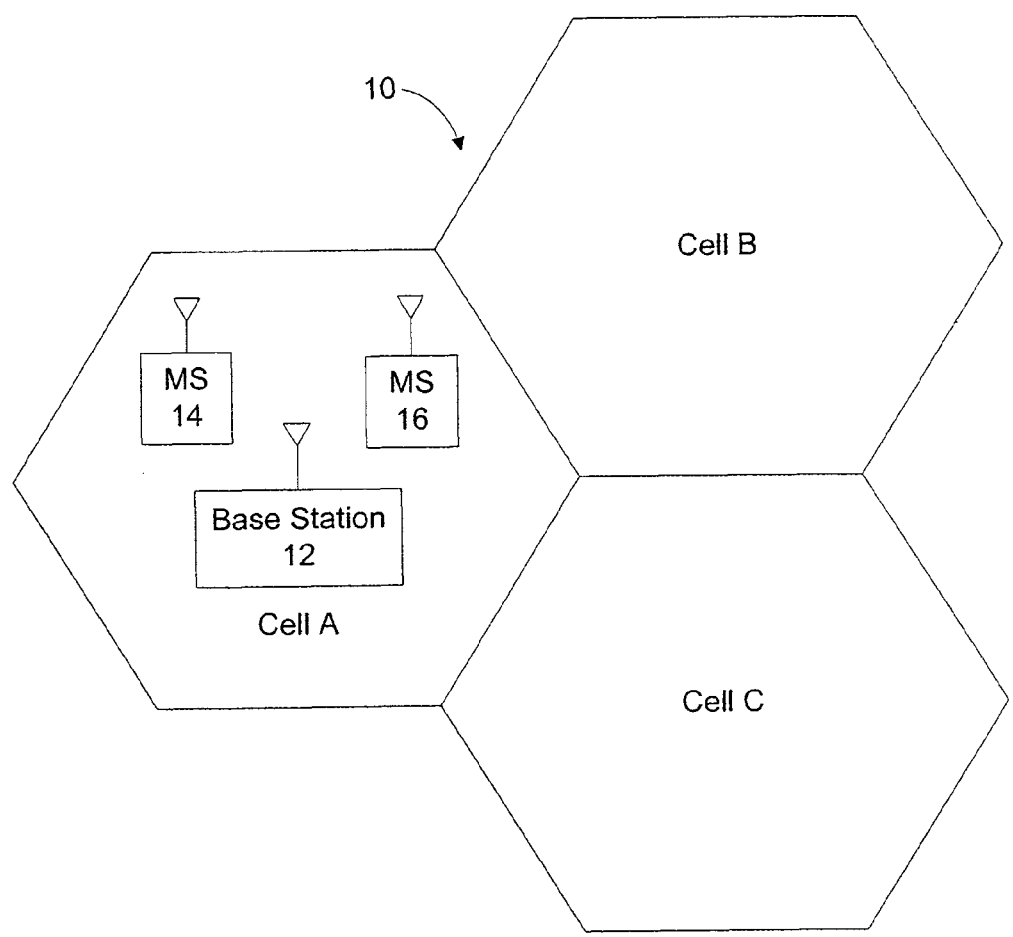

Appendix A is a Visual Basic source code listing of exemplary application logic for identifying a maximum number of users for a specified number of channels at a target offered transmission rate, according to an aspect of the present invention.

Appendix B is a Visual Basic source code listing of exemplary application logic for finding the required number of channels to service a specific number of users at a specified target rate, according to an aspect of the present invention.

DETAILED DESCRIPTION OF EMBODIMENTS

The present invention relates to dimensioning a packet-based telecommunications network, based on a desired offered transmission rate, or target throughput, at various network elements within the telecommunications network, including base stations and routers. An embodiment of the invention enables the network planner to determine the maximum number of users that are assured the target throughput on a predetermined number of channels, for any given application environment, based on known traffic engineering blocking probability formulae. Another embodiment of the invention enables the network planner to determine the minimum number of channels in a base station, for example, that are required to support a predetermined number of users at the target throughput for any given application environment.

Objectives of the present invention include enabling optimal design and implementation of broadband, packet switched data networks, including the second and third generation wireless networks. Efficiency in handling network traffic is enhanced by the ability to determine the maximum number of users that can be provided a target throughput over a known number of channels. For example, the number of users supported by a base station may be limited to the maximum number (dictated by the physical resources), or additional channels may be added to the network (e.g., by allocating more time slots out of the existing based stations or by adding more base stations) when the determined maximum number exceeds the known or estimated number of network users. Likewise, network planning is enhanced by the ability to identify the number of channels needed to support a known or estimated number of users at the desired throughput, avoiding excessive or inadequate capital investment in network resources.

In view of the above, the present invention through one or more of its various aspects and/or embodiments is presented to accomplish one or more objectives and advantages, such as those noted below.

An aspect of the present invention provides a computer readable medium that stores a computer program for dimensioning a communications network based on determining a maximum number of users able to receive a predetermined target throughput of data over a predetermined number of channels. The communications network may be a wireless network. The computer readable medium includes source code segments that respectively calculate, for each of an incremental number of users, at least one blocking probability based on a traffic distribution model, a service delay based on the blocking probability, and an iterative throughput based on the blocking probability and the service delay. A comparing source code segment compares each iterative throughput to the target throughput and identifies the maximum number of users as the number of users having a corresponding iterative throughput that is the largest iterative throughput less than the target throughput. The traffic distribution model may be based on a Poisson process a Markov model, or both.

The computer readable medium may further include a source code segment that determines a weighted average user load, based on percentages of users corresponding to various application types, such that calculating the service delay is further based on the weighted average user load. Another source code segment may calculate an effective channel throughput, such that calculating the service delay is further based on the effective channel throughput. The effective channel throughput may be calculated based on correcting a throughput associated with a predetermined coding scheme for at least one overhead requirement. Furthermore, for each of the incremental number of users, the blocking probability may correspond to a predetermined number of buffers in use and the service delay is calculated based on the blocking probability corresponding to the maximum number of buffers. Dimensioning the communications network thereby accounts for round robin queuing, when the maximum number of buffers is greater than one.

Another aspect of the present invention provides a computer readable medium storing a computer program for determining a maximum number of users in a packet switched data network assured a predetermined target throughput over a predetermined number of channels in at least one base station of the packet switched data network. The computer program establishes initial parameters of the base station and calculates at least one blocking probability for a first number of users, based on at least one of the initial parameter of the base station. Each blocking probability corresponds to each of a predetermined total number of buffers. The program further calculates a service delay for the first number of users, based on at least one of the initial parameters and the blocking probability corresponding to the total number of buffers, and an interim throughput for the first number of users, based on each of the blocking probabilities and the service delay. The computer program then determines whether the interim throughput is less than the target throughput and, when the interim throughput is not less than the target throughput, identifies the maximum number of users as one fewer than the first number of users.

The computer program may further increment the first number of users by one to obtain a second number of users when the program determines that the interim throughput is less than the target throughput. The program further calculates at least one second blocking probability for the second number of users, based on at least one of the initial parameters. Each blocking probability corresponds to each of the total number of buffers. A second service delay is calculated for the second number of users, based on at least one of the initial parameters and the second blocking probability corresponding to the total number of buffers. Likewise, a second interim throughput is calculated for the second number of users, based on each of the second blocking probabilities and the second service delay. When the second interim throughput is determined to be not less than the target throughput, the maximum number of users is identified as one fewer than the second number of users.

The initial parameters may be established by identifying the predetermined number of channels and a weighted average user load. Also, calculating the blocking probability may be based on a formula assuming at least one of a Poisson and a Markov based traffic distribution model, including, for example, an Erlang C formula. Calculating the service delay may be further based on the weighted average user load and an effective channel throughput.

Another aspect of the present invention provides a computer readable medium that stores a computer program for dimensioning a communications network based on determining a minimum number of channels able to support a predetermined number of users at a predetermined target throughput of data. The communications network may be a wireless network. The computer readable medium includes source code segments that respectively calculate, for each of an incremental number of channels, at least one blocking probability based on a traffic distribution model, a service delay based on the blocking probability, and an iterative throughput based on the blocking probability and the service delay. A comparing source code segment compares each iterative throughput to the target throughput and identifies the minimum number of channel as the number of channels having a corresponding interim throughput that is greater than or equal to the target throughput. The traffic distribution model may be based on a Poisson process a Markov model, or both.

The computer readable medium may further include a source code segment that determines a weighted average user load, based on percentages of users corresponding to various application types, such that calculating the service delay is further based on the weighted average user load. Another source code segment may calculate an effective channel throughput, such that calculating the service delay is further based on the effective channel throughput. The effective channel throughput may be calculated based on correcting a throughput associated with a predetermined coding scheme for at least one overhead requirement. Furthermore, for each of the incremental number of channels, the blocking probability may correspond to a predetermined number of buffers in use and the service delay is calculated based on the blocking probability corresponding to the maximum number of buffers. Dimensioning the communications network thereby accounts for round robin queuing, when the maximum number of buffers is greater than one.

Another aspect of the present invention provides a computer readable medium storing a computer program for determining a minimum number of channels of at least one base stations in a packet switched data network that assures a predetermined target throughput for a predetermined number of users in the base station. The computer program establishes initial parameters of the base station and calculates at least one blocking probability for a first number of channels, based on at least one of the initial parameters of the base station. Each blocking probability corresponds to each of a predetermined total number of buffers. The program further calculates a service delay for the first number of channels, based on at least one of the initial parameters and the blocking probability corresponding to the total number of buffers, and an interim throughput for the first number of users, based on each of the blocking probabilities and the service delay. The computer program then determines whether the interim throughput is greater than or equal to the target throughput and, when the interim throughput is greater than or equal to the target throughput, identifies the minimum number of channels as the first number of channels.

The computer program may further increment the first number of channels by one to obtain a second number of channels when the program determines that the interim throughput is less than the target throughput. The program further calculates at least one second blocking probability for the second number of channels, based on at least one of the initial parameters. Each blocking probability corresponds to each of the total number of buffers. A second service delay is calculated for the second number of channels based on at least one of the initial parameters and the second blocking probability corresponding to the total number of buffers. Likewise, a second interim throughput is calculated for the second number of channels, based on each of the second blocking probabilities and the second service delay. If the second interim throughput is determined to be greater than or equal to the target throughput, the minimum number of channels is identified as the second number of channels.

Yet another aspect of the present invention provides a method for dimensioning a communications network based on determining a maximum number of users able to receive a predetermined target throughput over a predetermined number of channels. At least one blocking probability is calculated based on a traffic distribution model, for each of an incremental number of users. A service delay is calculated based on the blocking probability, for each of the incremental number of users. An iterative throughput is calculated based on the at least one blocking probability and the service delay, corresponding to each of the incremental number of users. Each iterative throughput is compared to the target throughput. The maximum number of users is identified as the number of users having a corresponding iterative throughput that is the largest iterative throughput less than the target throughput.

Similarly, another aspect of the present invention provides a method for dimensioning a communications network based on determining a minimum number of channels able to support a predetermined number of users at a predetermined target throughput. At least one blocking probability is calculated based on a traffic distribution model, for each of an incremental number of channels. A service delay is calculated based on the at least one blocking probability, for each of the incremental number of channels. An interim throughput is calculated based on the blocking probability and the service delay, corresponding to each of the incremental number of channels. Each interim throughput is compared to the target throughput. The minimum number of channels is identified as the number of channels having a corresponding interim throughput that is greater than or equal to the target throughput.

The various aspects and embodiments of the present invention are described in detail below.

The present invention is implementable in a wireless network involving packet transmission, including the enhanced second generation, as well as the third generation cellular systems, such as the exemplary wireless network 10, which is implemented according to well known cellular communication techniques. For example, the wireless network 10 includes cell A, cell B and cell C, located adjacent to one other. Cell A includes a base station 12, configured to enable communications with multiple wireless mobile stations, including for example mobile stations 14 and 16, which are shown as located within cell A. Cells B and C likewise include respective base stations (not pictured) that operate substantially the same as the base station 12. The mobile stations 14 and 16 may include wireless communication devices, such as cellular telephones, multi-media communicators, personal digital assistants (PDA), and the like, as well as devices such as desktop personal computers, laptop personal computers, facsimile machines, and the like, working through a cellular modem. Mobile stations 14 and 16 may move from cell to cell during the course of an active communication session, in which case cell A performs a coordinated handover or handoff to one of the adjacent cells, whenever one of the mobile stations travels into cell B or cell C.

The base station 12 includes a data processor that allocates RF channels to various users, processes the communications, maintains QoS requirements, coordinates handovers of the mobile stations 14 and 16, and the like. The base station 12 has been designed to dynamically allocate a specific number of RF channels (e.g., time slots) for communication with each mobile station 14 and 16. A greater number of channels enables a larger offered data rate, enabling a higher QoS to the user. However, a greater number of channels allocated to a user reduces the total number of channels that could be available to other users, thus reducing the number of total users that the base station 12 is able to serve at the same QoS.

The base station 12 includes traffic channels (TCH) and at least one control channel. Each TCH may be used as a packet data channel (PDCH) that carries digital voice, data and video signals. The control channel is a digital control channel (DCH). The control channel coordinates the operation of the mobile stations 14 and 16 based on data transmitted to and from the base station 12, including call originations, voice channel assignments and paging signals.

In an embodiment of the invention, each channel may include round robin queuing. Round robin queuing enables multiple callers to share a single channel or set of channels of the base station 12 by changing rates and delays associated with the respective callers. The number of callers enabled by round robin queuing is predetermined at the base station 12 and generally may not exceed eight callers. A greater number of callers admitted to the round robin queuing effectively reduces the data rate of the channel.

As stated above, the base station 12 is one of multiple base stations within the wireless network 10. Each base station represents a significant capital expenditure by the cellular network provider. The general goal, therefore, is to provide an acceptable level of service to accommodate the typical level of users during the peak busy hour, while minimizing the number and extent of idle resources. In particular, the network provider identifies a target offered transmission rate, or target throughput, which is the minimum throughput that users are assured for their wireless communications. Fewer network users result in a higher perceived offered rate.

This invention can be used in the dimensioning the channel to subscriber requirement in any packet-switched network. However, since in wireless networks, the channels are at a very high premium, this invention is especially useful in regard to cellular wireless systems and fixed broadband wireless system, such as those providing services equivalent to wireless digital subscriber line (DSL) systems.

Frequent network dimensioning is required to keep pace with the dynamic nature of available services and the fluctuating number of users. The dimensioning occurs in two basic formats: (i) identifying the number of users that can be accommodated by a network resource, e.g., the base station 12, through a predetermined number of channels; and (ii) identifying the number of channels that must be available to accommodate a target number of users.

Figure 2:
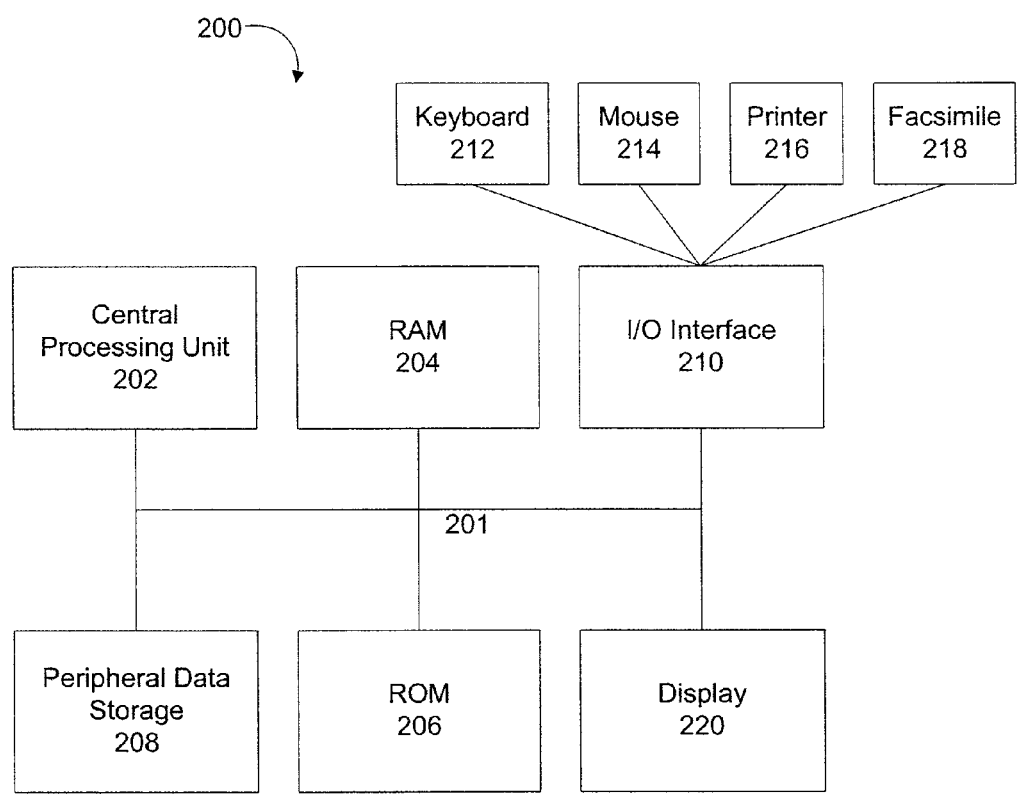
FIG. 2 is a block diagram showing an exemplary computing system that enables dimensioning, according to an aspect of the present invention.

In an embodiment of the present invention, the wireless network dimensioning process is implemented on a computer system 200, an example of which is depicted in FIG. 2. The computer system 200 receives data and executes a computer program to perform the steps described with respect to FIGS. 3 and 4, below. The data received by the computer system 200 includes information needed to dimension the wireless network, including the target throughput, the number of users, the number of channels allocated for each user, the coding scheme, the desired GoS, overhead considerations and the like, discussed in detail herein.

The exemplary computer system 200 includes a central processing unit (CPU) 202, which operates, for example, a personal computer (not pictured), and is capable of executing the computer program. In an embodiment of the invention, a general purpose standalone computer, running a consumer or enterprise operating system, is used. For example, the computer system 200 may be implemented with an IBM Pentium based personal computer, running the Microsoft Windows operating system, available from Microsoft Corporation. The computer system 200 may be additionally implemented with a spread sheet program, such as Microsoft Excel. The CPU 202 is connected by a bus 201 to well known computer components, including a random access memory (RAM) 204, a read-only memory (ROM) 206, a peripheral data storage device 208, an input/output interface 210 and a display 220.

The computer program consists of computer readable code compatible with the CPU 202, which executes the program to implement the dimensioning process. In an embodiment of the present invention, the programming is coded in the Visual Basic programming language. The computer program is accessible by the CPU 202 through the RAM 204, and may be read from ROM 206 or the peripheral data storage device 208, which may include a hard disk drive and a compact disk drive. The program and data may also be received and transmitted through a network connection (not shown).

The I/O interface 210 enables conventional peripheral computer equipment, such as a keyboard 212, a mouse 214, a printer 216 and a facsimile device 218. The keyboard 212 and the mouse 214 enable the user to input data and instructions to the computer system 200. User interface and interactive processing is facilitated by incorporation of a display 220, which may be a conventional cathode ray tube or liquid crystal display monitor. For example, the user may invoke a task or operation displayed on the display 220 by positioning a mouse cursor on the task and depressing the appropriate button to indicate the desired selection. The results of the computer program are displayed on the display 220, and may be printed or transmitted by facsimile at the printer 216 and the facsimile device 218, respectively. The results are incorporated into the dimensioning analysis, by which the network planner decides how to appropriately implement the dimensioning network, including increasing the number of time slots or transceivers in existing base stations, increasing the number of base stations, limiting the number of users, identifying and adjusting the target offered transmission rate, and the like, either manually or through an automated computer aided design system.

In an embodiment of the invention, the system dimension, for an applicable set of parameters in a given application environment, is found through an algorithm that determines the number of users, such that the resulting net throughput will not be less than the throughput that the operator is guaranteeing the user. The net throughput is calculated as a probabilistic average of different rates that could be in effect when different numbers of calls have arrived into the system with probabilities calculated based on a Markov assumption and Poisson arrivals.

Figure 3:
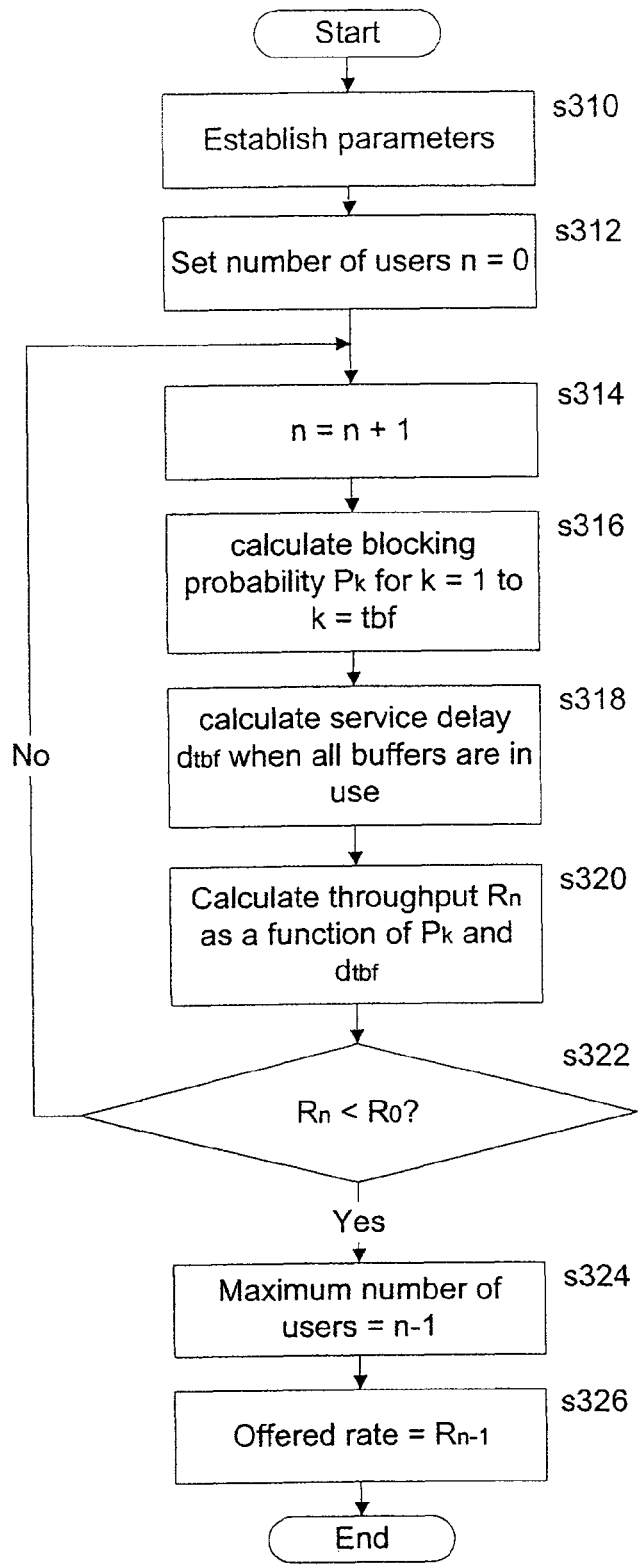
FIG. 3 is a flowchart of exemplary application logic for identifying a maximum number of users for a specified number of channels at a target offered transmission rate, according to an aspect of the present invention.

FIG. 3 is a flowchart of exemplary application logic for identifying the maximum number of users that may be provided the target throughput using a specified number of data packet channels in the base station 12. The analysis is repeated for each base station in the wireless network 10. Exemplary source code in Visual Basic, relating to the process depicted in FIG. 3, is attached as Appendix A. The source code is for functions called from a Microsoft Excel spreadsheet handling the input/output and intermediate data manipulation, an example of which is shown in Table 2, below.

At step s310, the basic parameters used to dimension the network are established. The parameters include the target throughput 1%, the number of channels b allocated to all users in the base station 12 and the average user load L incurred at the base station 12.

The target throughput $R_0$ is determined by the network planner by essentially balancing between providing a desirable level of service and maximizing the number of users n on the wireless network 10. For example, the target throughput $R_0$ may be set at 8.2 kbps, which would be the offered transmission rate substantially guaranteed to each user of the base station 12, up to the maximum number of users, as determined below. The number of channels b is a design choice that is based on the projected GoS and QoS requirements or historical data. For example, b=2 allocates two channels for the users. The more channels allocated to a user would increase the data rate for that user, but reduces the overall number of users that can be serviced at the same QoS.

The average user load L is a weighted average calculated, for example, using empirical or estimated user loads in a busy hour associated with various applications invoked by the mobile devices 14 and 16, such as instant messaging, e-mail messaging, e-mail with an attachment, e-commerce, e-mail server access and file transfer. For example, the most common user application is instant messaging, which typically may have about 0.3 kbytes of data. In this example, the most demanding application is a file transfer, which typically may involve about 500 kbytes of data, but is performed relatively infrequently.

Table 1 provides an example of user load data used to determine the average user load L, using exemplary values for each table entry:

TABLE 1

| Application | Kbytes Per Use | Percentage of Users | Weighted Load |
|---|---|---|---|
| Instant messaging | 0.30 | 60 | 0.18 |
| E-mail messaging | 3.00 | 34 | 1.02 |
| E-mail with Attachment | 30.0 | 2 | 0.60 |
| E-commerce | 10.0 | 2 | 0.20 |
| E-mail server access | 300 | 1 | 3.00 |
| File transfer | 500 | 1 | 5.00 |
| Weighted Average User Load L (Kbytes) | | | 10.0 |

In other words, assuming one of each type of session in an hour, the above values will result in a weighted average user load of 10 kbytes, or L=10.

The unknown n, indicating the number of users, is initially set to zero at step s312 and incremented by one at step s314. At step s316, the blocking probability $P_k$ is calculated for a b channel system, having k buffers in use, when serving n users with an average load of L kbytes. In an embodiment of the invention, the blocking probability $P_k$ is calculated using the well-known Erlang C formula, which assumes a Markov system with a Poisson statistical model in regard to traffic arrival distributions:

$$P_k = \rho \bigg/ \left( \rho + \left( \sum_{i=0}^{b*k-1} \alpha^i / i! \right) \right) \quad \text{for } k = 1 \text{ to } k = tbf$$

where $\rho = \alpha^{b*k}/((b*k-1)!*(b*k-\alpha))$;

$\alpha$=the traffic generated by n users having L kbytes average load per hour, determined by multiplying the arrival rate for n users by the holding time (i.e., the time each job takes to pass through the channel); and tbf=temporary block flow is the number of buffers, which corresponds to the maximum number of users that can be admitted for round robin queuing.

A tbf equal to zero is taken here to indicate that there are no buffers in use, so the base station 12 processes calls at the maximum effective channel rate, $R_c$, discussed below. In this implementation, no buffers in use refers to the condition of blocked traffic being dropped rather than buffered, and is included for comparison purposes. In this context and notation, a tbf equal to one indicates that there is a buffer and that the traffic is buffered. However, no round robin queuing occurs, because round robin queuing requires a minimum of two buffers. In this context and notation, any tbf greater than one indicates round robin queuing. For example, when tbf is three, and more than three calls have arrived, each channel of the base station 12 can accommodate up to three simultaneous users (served sequentially). A single user is serviced at the maximum channel rate. A second call into the round robin queue causes both users to be serviced at one half the maximum channel rate. Likewise, a third call causes all three users to be serviced at one third the maximum channel rate.

In alternative embodiments, other blocking probability formulae may be incorporated to determine $P_k$, including formulae having different embedded assumptions in regard to traffic distribution and modeling, as well as other system models. For example, when offering the maximum rate (no buffers in this context), the blocking probability $P_k$, for k=0, is calculated using the well-known Erlang B formula for blocked calls dropped (or cleared). When offering a target throughput less than the channel maximum rate, the blocking probability $P_k$, for k≧1, is calculated using the well-known Erlang C formula for blocked calls delayed.

At step s318, the service delay $d_{tbf}$ is calculated, for the case when all indicated buffers (i.e., tbf) are in use and an incoming call cannot be served immediately. The service delay is calculated according to the following formula:

$$d_{tbf} = P_{tbf}*(8*L*tbf/R_c)/(b-\alpha)$$

where $P_{tbf} = P_k$ for k=tbf, $R_c$=the effective channel rate, which is the channel rate offered by the base station 12, adjusted for various practical implementation variables, such as adverse RF channel conditions and overhead. Determination of the effective channel rate $R_c$ is discussed in detail with respect to Table 2, below.

At step s320, the throughput for n users, represented by $R_n$, is calculated as a function of each previously calculated $P_k$ and $d_{tbf}$, according to the following formula:

$$R_n = R_c - \sum_{k=1}^{tbf-1}\left((R_c/k - R_c/(k+1)) * \prod_{i=1}^{k} P_i\right) - \left((R_c/tbf - R_{tbf}) * \prod_{i=1}^{tbf} P_i\right)$$

where $$R_{tbf} = 8*L*R_c/(8*L+R_c*d_{tbf}).$$

$R_{tbf}$ is the effective channel rate when tbf users are being served in the base station 12. For example, when the tbf is three, $R_3$ is the effective channel rate when three users are being simultaneously served from the round robin queue At step s322, the calculated throughput $R_n$ is compared to the target throughput $R_0$. When $R_n$ is not less than $R_0$, it indicates that the system can support the n users at a rate higher than the target throughput $R_0$. For example, the base station 12 is able to handle at least five users (i.e., n=5) when $R_5$ is calculated to be greater than $R_0$ (e.g., 8.2 kbps). In other words, the throughput of the base station 12 supporting five users is larger than the target throughput, which is the minimum throughput the network planner wants to provide all users.

While $R_n$ is not less than $R_0$, the number of users n is incremented by one at step s314 and calculation of the new $R_n$ is performed by repeating steps s316 to s320, using the incremented value of n. Step s322 is repeated for each iteration of the algorithm and $R_n$ is respectively calculated until $R_n$ is determined to be less than $R_0$. At that point, it is known that when the base station 12 handles n users, the effective throughput would be less than the target throughput. In other words, the network planner would not be able to guarantee the target throughput $R_0$ for this n users. Therefore, at step s324, it is determined that the maximum number of users that can be supported at the target throughput $R_0$ is one less than the last number of users for which the calculations were performed, or n−1. It is further determined at step s326 that the corresponding throughput for n−1 users is the rate $R_{n-1}$ determined at the previous iteration.

A specific example of the process described with respect to FIG. 3 is indicated by Table 2, which includes parameters 1 through 12 that are input by the network planner to determine the corresponding effective channel rate $R_c$ and the output, in accordance with the present invention:

TABLE 2

| INPUT | |
|---|---|
| 1 Type of bearer channel or system | GPRS |
| 2 Target throughput $R_0$ (kbps) | 8.2 |
| 3 Base station channel allocation | 2 |
| 4 Maximum number of mobile station channels | 1 |
| 5 Number of buffers | 2 |
| 6 Coding scheme | CS-2 |
| 7 GoS (for maximum rate only) | 0.01 |
| 8 Channel rate reduction factor (RF anomalies, etc.) | 10% |
| 9 Channel rate reduction factor (packet transmission overhead, etc.) | 6% |
| 10 Channel rate reduction factor (miscellaneous additional overhead) | 10% |
| 11 Activity factor | 100% |
| 12 Number of sessions per hour | 1 |

TABLE 2-continued

| OUTPUT | |
|---|---|
| Effective channel rate $R_c$ corresponding to above conditions (kbps) | 10.2 |
| Number of users n satisfying the above input parameters | 336 |

Table 2 is an exemplary illustration of the input and output values, which may be obtained by the network planner in accordance with any conventional recordation process, including displaying Table 2 as a screen shot on the display 220 and printing Table 2 as a spreadsheet at the printer 216.

Row 1 indicates the type of wireless system or the bearer channel to which the analysis applies, which, in the above example, is indicated to be GPRS. GPRS supports round robin queuing, so the variables relating to round robin queuing must be assigned values. The invention enables dimensioning of any type of packet-based communications network, including other next generation wireless systems, such as EDGE, WCDMA, CDMA 2000 and 1xRT, as well as fixed wireless access networks, such as wireless distribution for DSL services. Also, as stated above, this invention can be used in the dimensioning the channel to subscriber requirement in any packet-switched network.

Row 2 includes the target throughput $R_0$, which is 8.2 kbps in the depicted example. The network provider has determined that the base station 12 should be able to substantially guarantee at least 8.2 kbps to all users at any one time. Due to the ease with which the dimensioning process is implemented according to the present invention, the dimensioning process may be easily repeated using different target throughputs to create a sampling of results that the network planner may analyze.

Rows 3 and 4 include the allocated number of base station channels (e.g., PDCHs for GPRS) b and the maximum number of mobile station channels (e.g., PDCHs for GPRS), respectively. As indicated in Table 2, two PDCHs of the base station are available, while each mobile station is limited to at most one PDCH. The number of available base station channels is a design choice by the network provider based, for example, on the anticipated services, its available spectrum, and associated bandwidths (data rates) required by the users.

Row 5 indicates the number of buffers, such as temporary block flow (tbf) buffers, which corresponds to the round robin queue limit. Table 2 includes a tbf of two, which indicates that two buffers are assumed to be available and that two users would be able to simultaneously access each PDCH of the base station 12. As stated above, setting the tbf to zero indicates the case to offer the maximum transmission rate with blocked traffic dropped, and setting the tbf to one indicates no round robin queuing with blocked calls delayed.

Row 6 is the coding scheme (CS) associated with the base station 12, which is indicated as CS-2 for the depicted GPRS example. The coding scheme is inherent to the base station 12 data transmission and controls the relationship between the throughput and the redundancy introduced in the transmission for error detection and correction. For GPRS, for example, the coding schemes range from CS-1 to CS-4. CS-1, yielding a data rate of 9.05 kbps, offers the highest level of protection for bad channel conditions, while CS-4, offering a data rate of 21.4 kbps, with no convolutional coding, may be used in good channel conditions. In particular, the coding schemes and the corresponding transmission rates for GPRS, are indicated in Table 3:

TABLE 3

| Coding Scheme | Effective Rate |
|---|---|
| CS-1 | 9.05 kbps |
| CS-2 | 13.4 kbps |
| CS-3 | 15.6 kbps |
| CS-4 | 21.4 kbps |

Row 7 indicates the GoS to be used when maximum rate is being offered, in which case there would be no buffering and blocked calls are dropped. A GoS of 0.01 indicates that 99 percent of the calls are transmitted without any blocking.

Rows 8 to 10 of Table 2 indicate the different factors that might reduce the throughput in a wireless environment, for which the network planner must account. Row 8 represents the prevailing channel condition, which is the anticipated percentage of retransmissions to accomplish a successful data transfer on a scale of zero to 100 percent. For example, zero indicates no channel errors, so the channel rate is at its maximum value, and 20 indicates channel errors causing retransmissions resulting in a net rate of 80 percent of the maximum rate. The channel condition reflects the condition of the RF environment, and the value is determined based on the network planner's experience or data collected from the system data or through a simulation. The exemplary channel condition in Table 2 is 10 percent, which means the network planner believes the effective channel rate is at 90 percent of the maximum rate due to retransmissions.

Row 9 indicates the transmission overhead, including the packet header administrative signaling to establish the transmission session and IP addresses. Different packet transmission protocols have different overhead requirements, which detract from transmission efficiency. For example, user datagram protocol/Internet protocol (UDP/IP) offers minimal transport functionality, while transmission control protocol/Internet Protocol (TCP/IP) is more expansive, requiring significant additional overhead. In the example of Table 2, the anticipated overhead is assumed to be six percent.

Row 10 indicates the miscellaneous additional overhead that may be encountered and the system planner may wish to include as a factor reducing the overall channel rate. In the example depicted by Table 2, the miscellaneous overhead is assumed to be ten percent.

Rows 11 and 12 include the activity factor and the number of session for each hour, respectively. The activity factor is the percentage of time during a communication session that packet data is transmitted or received in one busy hour, and may be based on historical trends or estimations. The activity factor reflects the kinds of applications being supported, as well as the frequency of use of each application. When given instead of the user load L, the activity factor can be used (as an alternate method) to find the holding time as a percentage of the session length. Related to the activity factor is the number of sessions for each hour, which is the number of times the system is accessed by any one user during one busy hour. Row 12 indicates the number of sessions for each hour to be one. The activity factor in row 11 is 100 percent, which indicates that if, for example, the average session length was two seconds, then the user, on average, would be occupying the channel for the entire two seconds. As another example, an activity factor of 40 percent with three sessions per hour (and the same session length of two seconds, as discussed above), would indicate that the user, on average, would occupy the channel for 2.4 seconds (0.4*2*3=2.4 seconds).

The various parameters assigned in rows 1 through 12 of Table 2 must be taken into account when planning for the target throughput $R_O$. Because certain of the parameters effectively reduce the actual throughput of the base station 12, an effective channel rate $R_c$ is determined based on these parameters in order to assure that the target throughput $R_O$ can be achieved in practice. The effective channel rate $R_c$ is derived from the maximum channel rate, adjusted for the coding scheme and the RF anomaly factors, discussed above. Using the exemplary parameters of Table 2, the coding scheme is CS-2, which reflects a 13.4 kbps gross channel rate. The effective channel rate Rc is then determined by adjusting the 13.4 kbps for all of the channel rate reducing factor percentages (e.g., RF anomalies, packet overhead and miscellaneous overhead). In this example, the effective channel rate Rc would be (1−0.1)*(1−0.06)*(1−0.1)*13.4, or 10.2 kbps.

The output, indicated in the last row of Table 2, is the number of users, calculated according to the process of FIG. 3, based on the identified parameters (e.g., $R_O$=10, b=2, L=10, tbf=2, $R_c$=10.2). The output shows that 336 users of the exemplary GPRS wireless network, served by 2 channels (PDCHs) in the base station 12, have a high probability of the target throughput of 10 kbps being satisfied. When the target throughput is lower, the number of users will necessarily increase, with all other factors remaining the same.

In an embodiment of the invention, the system dimension, for an applicable set of parameters in a given application environment, is found through an algorithm that determines the number of channels, such that the resulting net throughput will not be less than the throughput that the operator is guaranteeing each user. As stated above, the net throughput is calculated as a probabilistic average of different rates that could be in effect when different numbers of calls have arrived into the system with probabilities calculated based on a Markov assumption and Poisson arrivals.

Figure 4:
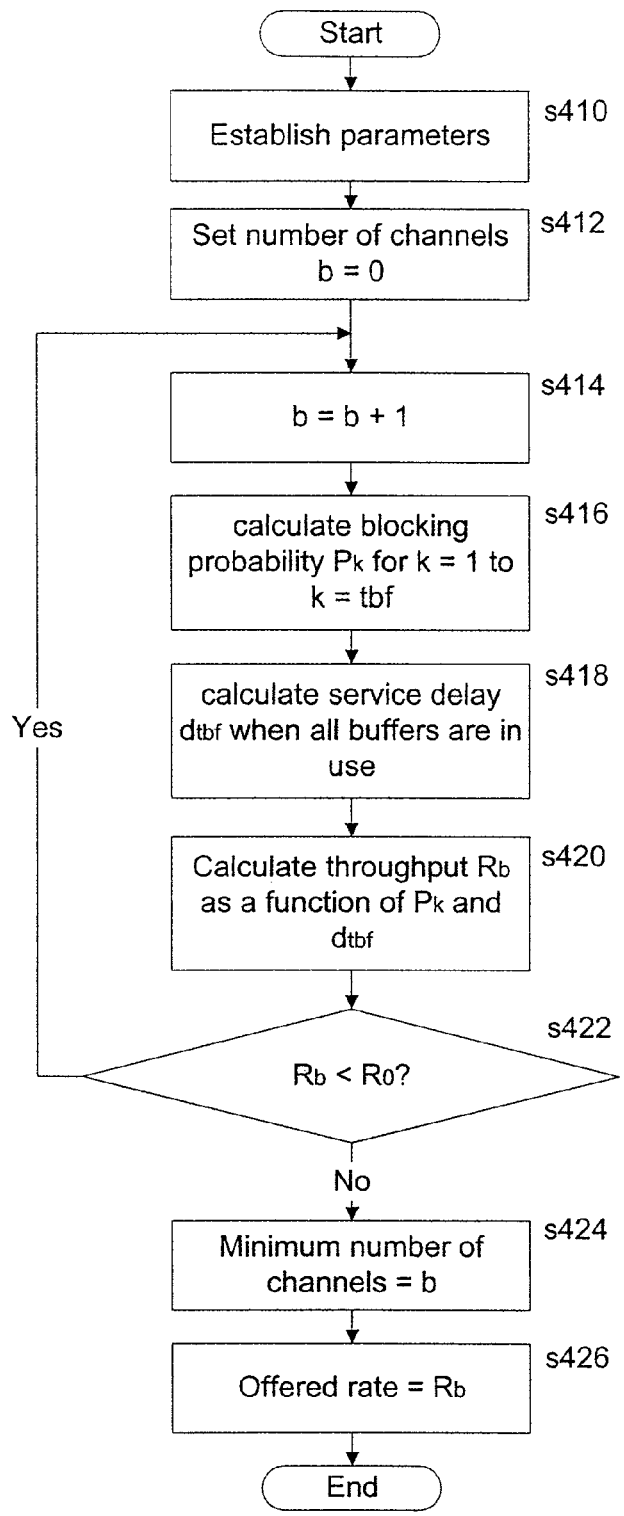
FIG. 4 is a flowchart of exemplary application logic for identifying a minimum number of channels required to accommodate a specified number of users at a target offered transmission rate, according to an aspect of the present invention.

FIG. 4 is a flowchart of exemplary application logic for identifying the number of channels in the base station 12 that are needed to accommodate a predetermined number of users at a target throughput. FIG. 4 is similar to FIG. 3 in that the same formulae are applied to iteratively determine throughputs and compare the calculated throughputs to the target throughput to find the result. The difference is that FIG. 4 begins with a predetermined number of users and calculates the required minimum number of base station channels, while FIG. 3 begins with a predetermined number of base station channels and calculates the maximum number of users satisfying the target throughput. Exemplary source code in Visual Basic, relating to the process depicted in FIG. 4, is attached as Appendix B. The source code is for functions called from a Microsoft Excel spreadsheet handling the input/output and intermediate data manipulation, an example of which is shown in Table 4, below.

At step s410, the basic parameters used to dimension the network are established. The parameters include the target throughput 1%, the anticipated number of users n and the average user load L with respect to the base station 12. Average user load L is calculated as described previously. The unknown b, indicating the number of channels, is initially set to zero at step s412 and incremented by one at step s414.

At step s416, the blocking probability $P_k$ is calculated for a b channel system, having k buffers in use, when serving n users with an average load of L kbytes. In an embodiment of the invention, the blocking probability $P_k$ is calculated, using the well-known Erlang C formula, using the same parameters and relationships as described above:

$$P_k = \rho \Big/ \left(\rho + \left(\sum_{i=0}^{b*k-1} \alpha^i/i!\right)\right) \text{ for } k=1 \text{ to } k=tbf$$

At step s418, the service delay $d_{tbf}$ is calculated, based on the assumption that all indicated buffers (i.e., tbf buffers) are in use, according to the following formula, using the same parameters and relationships as described above:

$$d_{tbf} = P_{tbf} * (8*L*tbf/R_c)/(b-\alpha)$$

At step s420, a throughput for b channels (as opposed to n users), represented by $R_b$, is calculated as a function of each previously calculated $P_k$ and $d_{tbf}$. The throughput $R_b$ is based on the following formula, using the same parameters and relationships described above:

$$R_b = R_c - \sum_{k=1}^{tbf-1}\left((R_c/k - R_c/(k+1))*\prod_{i=1}^{k} P_i\right) - \left((R_c/tbf - R_{tbf})*\prod_{i=1}^{tbf} P_i\right)$$

At step s422, the process departs from the process depicted in FIG. 3. In particular, the calculated throughput $R_b$ is compared to the target throughput $R_0$. When the throughput $R_b$ is determined to be less than the target throughput $R_0$, it indicates that the system cannot support n users at $R_0$ using only b channels. For example, when the calculated throughput for n users on one channel (i.e., b=1) is less than the target throughput, it indicates that a single channel is not sufficient to accommodate all of the users at the desired offered rate. Therefore, when $R_b$ is less than $R_0$, the number of channels b is incremented by one at step s414 and calculation of the new $R_b$ is performed by repeating steps s416 to s420, using the incremented value of b.

Step s422 is repeated to find $R_b$ for each iteration of the algorithm until $R_b$ is determined to be equal to or greater than $R_0$. At that point, it is known that when the base station 12 handles n users on b channels, it is able to provide a throughput that at least equals the target throughput. In other words, the network planner would be able to substantially guarantee the target throughput $R_0$ for the n users on b channels. Therefore, at step s424, it is determined that the minimum number of channels needed to support n users at the target throughput $R_0$ is equal to b. It is further determined at step s426 that the corresponding throughput capability of b channels is $R_b$, which is greater than or equal to $R_0$.

A specific example of the process described with respect to FIG. 4 is indicated by Table 4, which includes parameters 1 through 12 that are input by the network planner to determine the corresponding effective channel rate $R_c$ and the number of channels, in accordance with the present invention:

TABLE 4

| INPUT | |
| --- | --- |
| 1 Type of bearer channel or system | GPRS |
| 2 Target throughput $R_0$ (kbps) | 8.2 |
| 3 Target number of users | 336 |
| 4 Maximum number of mobile station channels | 1 |
| 5 Number of buffers | 2 |
| 6 Coding scheme | CS-2 |
| 7 GoS (for maximum rate only) | 0.01 |

TABLE 4-continued

| | |
| --- | --- |
| 8 Channel rate reduction factor (RF anomalies, etc.) | 10% |
| 9 Channel rate reduction factor (packet transmission overhead, etc.) | 6% |
| 10 Channel rate reduction factor (miscellaneous additional overhead) | 10% |
| 11 Activity factor | 100% |
| 12 Number of sessions per hour | 1 |
| OUTPUT | |
| Effective channel rate $R_c$ corresponding to above conditions (kbps) | 10.2 |
| Number of channels b satisfying the above input parameters | 2 |

The inputs of Table 4 are the same as the inputs of Table 2, except that a target number of users is entered in Row 3 instead of an allocated number of channels. The analysis for each of the remaining rows is therefore identical for both tables. The output of Table 4 differs from Table 2 in that the number of channels b is determined instead of the number of users n. In particular, the output indicated in the last row of Table 4 is the number of channels, calculated according to the process of FIG. 4, based on the identified parameters (e.g., $R_0$=10, n=336, L=10, tbf=2, $R_c$=10.2). The output shows that 336 users of the exemplary GPRS wireless network, served by 2 channels (PDCHs) in the base station 12, have a high probability of the target throughput of 10 kbps being satisfied.

Additional embodiments of the invention enable the determination of the optimum (or acceptable) values for the round robin queue limits, as well as the determination of the optimum (or acceptable) number of mobile station channels, corresponding to a desired number of users and base station channels. In the additional embodiments, for the desired number of users and base station channels, the algorithm finds the effective throughput over a set of round robin queue limits or a set of mobile station channels. The optimum (or acceptable) value of the round robin queue limit, or of the number of mobile station channels, would then be the value corresponding to the maximum (or an acceptable) throughput. Alternatively, the algorithm finds, for the desired number of base station channels, the number of users over a set of round robin queue limits or a set of mobile station channels. The optimum (or acceptable) value of the round robin queue limit, or of the number of mobile station channels, would then be the value corresponding to the maximum (or an acceptable) number of users.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., TCP/IP, UDP/IP) and cellular networks (GPRS, EDGE, WCDMA) represent examples of the state of the art. Such standards are periodically superseded by faster or more efficient equivalents having essentially the same functions. Accordingly, replacement standards and protocols having the same functions are considered equivalents.

What is claimed is:

1. A non-transitory computer readable medium storing computer-executable instructions for dimensioning a communications network based on determining a number of terminals to receive a predetermined target throughput of data over a predetermined number of communication channels in the network, the computer readable medium comprising:
    a blocking probability calculating code segment executable to calculate a blocking probability, for each of an incremental number of terminals;
    a service delay calculating code segment executable to calculate a service delay, based on the blocking probability, for each of the incremental number of terminals;
    an iterative throughput calculating code segment executable to calculate an iterative throughput, based on the blocking probability and the service delay, corresponding to each of the incremental number of terminals; and
    a determining code segment executable to determine the number of terminals to receive the predetermined target throughput in accordance with the calculated iterative throughputs.

2. The computer readable medium according to claim 1, wherein the blocking probability calculating code segment is executable to calculate the blocking probability based on a traffic distribution model.

3. The computer readable medium according to claim 1, wherein the determining code segment is executable to determine the number of terminals to receive the predetermined target throughput by comparing each iterative throughput to the target throughput and identifying the number of terminals to receive the predetermined target throughput as the number of users having a corresponding iterative throughput that is a largest iterative throughput less than the target throughput.

4. The computer readable medium according to claim 1, further comprising an initializing code segment executable to establish initial parameters of at least one base station of the network.

5. The computer readable medium according to claim 4, wherein the blocking probability code segment is executable to calculate the blocking probability based on at least one of the initial parameters, and the service delay calculating code segment is executable to calculate a service delay based on at least one of the initial parameters.

6. A non-transitory computer readable medium storing computer-executable instructions for dimensioning a communications network based on determining a number of channels to support a predetermined number of terminals at a predetermined target throughput, the computer readable medium comprising:
    a blocking probability calculating code segment executable to calculate a blocking probability, for each of an incremental number of channels;
    a service delay calculating code segment executable to calculate a service delay, based on the blocking probability, for each of the incremental number of channels;
    an iterative throughput calculating code segment executable to calculate an iterative throughput, based on the blocking probability and the service delay, corresponding to each of the incremental number of channels; and
    a determining code segment executable to determine the number of channels to support the predetermined number of terminals in accordance with the calculated iterative throughputs and the target throughput.

7. The computer readable medium according to claim 6, wherein the blocking probability calculating code segment is executable to calculate the blocking probability based on a traffic distribution model.

8. The computer readable medium according to claim 6, wherein the determining code segment is executable to determine the number of channels to support the predetermined number of terminals by comparing each iterative throughput to the target throughput and identifying the number of channels to support the predetermined number of terminals as the number of channels having a corresponding iterative throughput that is greater than or equal to the target throughput.

9. The computer readable medium according to claim 6, further comprising an initializing code segment executable to establish initial parameters of at least one base station of the network.

10. The computer readable medium according to claim 9, wherein the blocking probability code segment is executable to calculate the blocking probability based on at least one of the initial parameters, and the service delay calculating code segment is executable to calculate a service delay based on at least one of the initial parameters.

11. A method for dimensioning a communications network based on determining a number of terminals to receive a predetermined target throughput of data over a predetermined number of channels, the method comprising:
    calculating a blocking probability, for each of an incremental number of terminals;
    calculating a service delay, based on the blocking probability, for each of the incremental number of terminals;
    calculating an iterative throughput, based on the blocking probability and the service delay, corresponding to each of the incremental number of terminals;
    and determining the number of terminals to receive the predetermined target throughput in accordance with the calculated iterative throughputs and the target throughput.

12. The method according to claim 11, wherein the blocking probability is calculated based on a traffic distribution model.

13. The method according to claim 11, wherein the number of terminals to receive the predetermined target throughput is determined by comparing each iterative throughput to the target throughput and identifying the number of terminals to receive the predetermined target throughput as the number of terminals having a corresponding iterative throughput that is a largest iterative throughput less than the target throughput.

14. The method according to claim 11, further comprising establishing initial parameters of at least one base station of the network.

15. The method according to claim 14, wherein the blocking probability and the service delay are calculated based on at least one of the initial parameters.

16. A method for dimensioning a communications network based on determining a number of channels to support a predetermined number of terminals at a predetermined target throughput, the method comprising:
- calculating a blocking probability, for each of an incremental number of channels;
- calculating a service delay, based on the blocking probability, for each of the incremental number of channels;
- calculating an iterative throughput, based on the blocking probability and the service delay, corresponding to each of the incremental number of channels; and
- determining the number of channels to support the predetermined number of terminals at the predetermined target throughput in accordance with the calculated iterative throughputs and the target throughput.

17. The method according to claim 16, wherein the blocking probability is calculated based on a traffic distribution model.

18. The method according to claim 16, wherein the number of channels to support the predetermined number of terminals at the predetermined target throughput is determined by comparing each iterative throughput to the target throughput and identifying the number of channels to support the predetermined number of terminals at the predetermined target throughput as the number of channels having a corresponding iterative throughput that is greater than or equal to the target throughput.

19. The method according to claim 16, further comprising establishing initial parameters of at least one base station of the network.

20. The method according to claim 19, wherein the blocking probability and the service delay are calculated based on at least one of the initial parameters.

* * * * *